(12) United States Patent
Niles et al.

(10) Patent No.: US 9,713,210 B2
(45) Date of Patent: Jul. 18, 2017

(54) LED LIGHTING SYSTEM

(71) Applicant: SEMICONDUCTOR COMPONENTS INDUSTRIES, LLC, Phoenix, AZ (US)

(72) Inventors: Andrew Niles, Mesa, AZ (US); Andrew K. Stemple, Reston, VA (US); Kevin Joseph O'Connor, Tempe, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/254,799

(22) Filed: Sep. 1, 2016

(65) Prior Publication Data

US 2017/0079103 A1 Mar. 16, 2017

Related U.S. Application Data

(60) Provisional application No. 62/219,095, filed on Sep. 15, 2015, provisional application No. 62/219,098, filed on Sep. 15, 2015.

(51) Int. Cl.
*H05B 33/08* (2006.01)

(52) U.S. Cl.
CPC ....... *H05B 33/0827* (2013.01); *H05B 33/089* (2013.01); *H05B 33/0809* (2013.01); *H05B 33/0815* (2013.01)

(58) Field of Classification Search
USPC ........... 315/247, 185 S, 224, 225, 209 R, 315/307–326, 291, 246, 75, 74, 107, 315/121–128, 119; 327/66, 53, 63
See application file for complete search history.

(56) References Cited

U.S. PATENT DOCUMENTS

| | | |
|---|---|---|
| 2003/0209994 A1 | 11/2003 | Kerenyi, Jr. |
| 2010/0188002 A1 | 7/2010 | Hung et al. |
| 2011/0175532 A1 | 7/2011 | Peng |
| 2012/0153869 A1 | 6/2012 | Sadwick et al. |
| 2013/0187555 A1 | 7/2013 | Pan et al. |
| 2013/0200801 A1* | 8/2013 | Fratti ............. H05B 33/0827 315/122 |
| 2014/0021860 A1 | 1/2014 | Baccarin et al. |
| 2014/0239824 A1 | 8/2014 | Li |
| 2015/0042234 A1* | 2/2015 | Lee ............. H05B 33/0824 315/193 |

* cited by examiner

*Primary Examiner* — Tuyet Vo
(74) *Attorney, Agent, or Firm* — Conley Rose, P.C.

(57) ABSTRACT

A system, in some embodiments, comprises: multiple light emitting diode (LED) strings configurable in series or in parallel depending on a supply voltage provided in the system; and multiple current regulators, a different one of the multiple current regulators coupled to each of the multiple LED strings and configured to regulate current passing through a respective LED string, wherein at least one of the multiple current regulators is bypassed when the multiple LED strings are configured in series.

20 Claims, 4 Drawing Sheets

LED LIGHTING SYSTEM

CROSS-REFERENCE TO RELATED APPLICATIONS

This non-provisional application claims priority to U.S. Provisional Application No. 62/219,095, which was filed on Sep. 15, 2015 and is incorporated herein by reference. This non-provisional application also claims priority to U.S. Provisional Application No. 62/219,098, which was filed on Sep. 15, 2015 and is incorporated herein by reference.

BACKGROUND

Many lighting systems—for instance, those deployed in automotive applications—use light emitting diodes (LEDs). LEDs are advantageous at least because they are energy efficient and durable compared to non-LED lighting solutions. LEDs in lighting systems may be configured in various ways—for example, they may be coupled in series, in parallel, or in some combination thereof. The precise manner in which LEDs are configured may have significant effects on the efficiency and quality of light output.

SUMMARY

At least some of the embodiments disclosed herein are directed to a system, comprising: multiple light emitting diode (LED) strings configurable in series or in parallel depending on a supply voltage provided in the system; and multiple current regulators, a different one of the multiple current regulators coupled to each of the multiple LED strings and configured to regulate current passing through a respective LED string, wherein at least one of the multiple current regulators is bypassed when the multiple LED strings are configured in series. One or more such embodiments may be supplemented using one or more of the following concepts, in any order and in any combination: wherein at least one of the multiple current regulators comprises a bipolar junction transistor (BJT); wherein each of the multiple current regulators is active when the multiple LED strings are configured in parallel; wherein each of the multiple LED strings comprises at least two LEDs; further comprising a universal control circuit configured to simultaneously switch multiple switches to configure the multiple LED strings in series or in parallel; further comprising a threshold detection circuit adapted to configure the multiple LED strings in series or in parallel based on a comparison of said supply voltage and a threshold voltage; wherein said threshold voltage is a function of ambient temperature; wherein the threshold detection circuit comprises multiple BJTs, and wherein base-emitter drop voltages of said multiple BJTs dictate said threshold voltage; further comprising a current regulator short circuit logic configured to short circuit said at least one of the multiple current regulators; further comprising an overvoltage protection circuit configured to stop current flow through said multiple LED strings when said supply voltage exceeds an overvoltage threshold and said multiple LED strings are coupled in series; wherein said multiple LED strings are coupled with a Schottky diode.

At least some embodiments are directed to a system, comprising: multiple LED strings configurable in series or in parallel depending on a supply voltage provided in the system; multiple current regulators, a different one of the multiple current regulators coupled to each of the multiple LED strings and configured to regulate current passing through a respective LED string; and an overvoltage protection circuit configured to block current flow through said multiple LED strings when said supply voltage exceeds an overvoltage threshold. One or more such embodiments may be supplemented using one or more of the following concepts, in any order and in any combination: further comprising a current regulator short circuit logic configured to short circuit at least one of the multiple current regulators when the multiple LED strings are configured in series; further comprising two BJTs and a diode configured to switch the multiple LED strings between series and parallel configurations; wherein at least one of the current regulators comprises multiple PNP BJTs; wherein at least one of the current regulators comprises multiple NPN BJTs; further comprising a universal control circuit configured to simultaneously switch multiple switches to configure the multiple LED strings in series or in parallel; further comprising a threshold detection circuit adapted to configure the multiple LED strings in series or in parallel based on a comparison of said supply voltage and a threshold voltage, wherein the threshold voltage varies based on an ambient temperature affecting the system.

At least some embodiments are directed to a system, comprising: a first LED string having one or more LEDs; a second LED string having one or more LEDs, said first and second LED strings coupled via a Schottky diode and each of said first and second LED strings coupled to a different switch; a current regulator circuit coupled to the first LED string and comprising a resistor and multiple switches; and a current regulator short circuit logic coupled to the current regulator circuit and comprising a diode and a switch. One or more such embodiments may be supplemented using the following concept: further comprising a universal control circuit configured to simultaneously switch said different switches.

Figure 1:
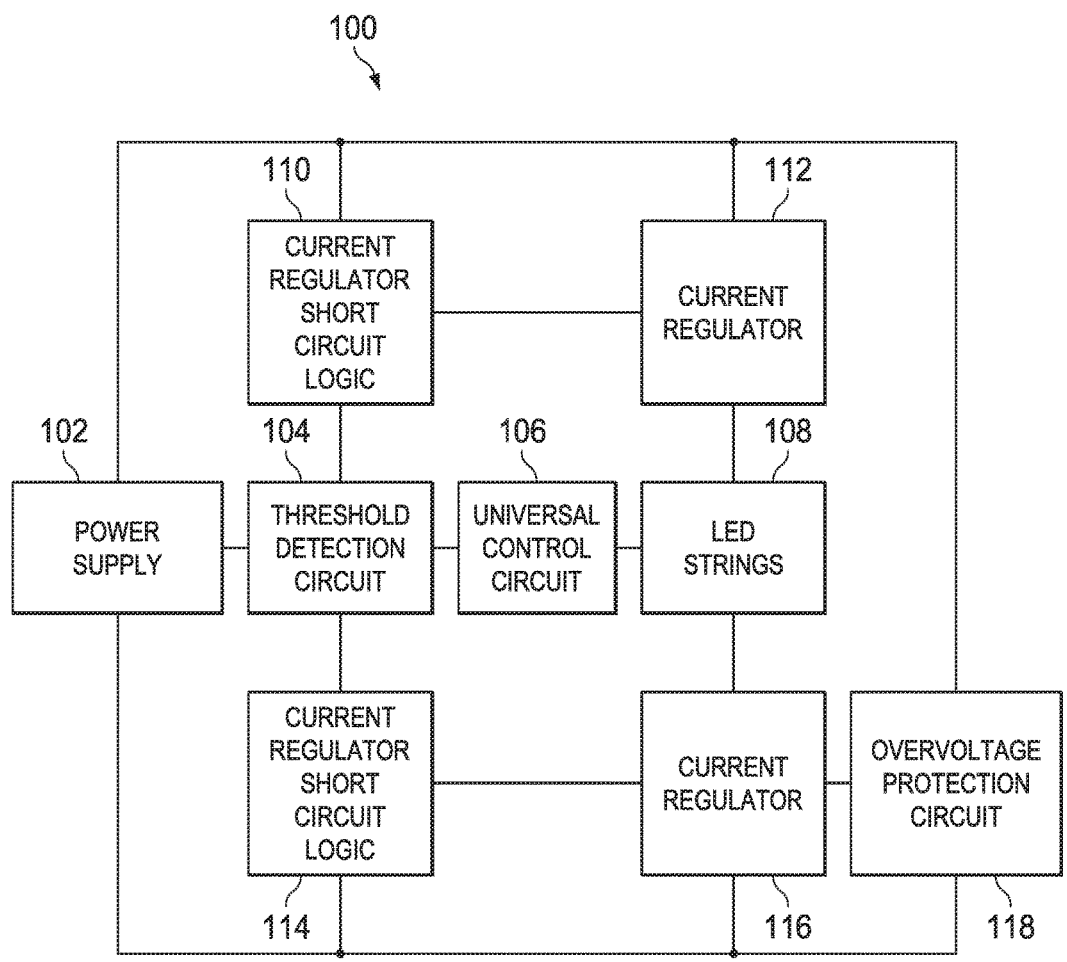
FIG. 1 is a block diagram of an efficient and high-quality LED lighting system.

It should be understood that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are various embodiments of an efficient, high-quality (e.g., flicker-free) light-emitting diode (LED) lighting system suitable for use in automotive and other applications. The LED lighting system includes multiple LED strings, with each LED string having one or more LEDs. The LED strings are coupled to each other and to the remainder of the lighting system using switches that can be turned on and off to switch the LED strings between series and parallel configurations. A series configuration, in which the LEDs in the LED strings are coupled in series, typically provides a higher level of efficiency than does a parallel configuration, but it is prone to decreased light quality if the total voltage requirement across all LEDs and other circuitry is close to or exceeds the supply voltage. Conversely, a parallel configuration, in which the LED strings are coupled in parallel, typically provides increased headroom between the total voltage drop across the LEDs and the supply voltage. This minimizes light output quality problems due to insufficient voltage. The parallel configuration, however, is prone to poor efficiency. Thus, in at least some embodiments, the disclosed LED lighting system switches between series and parallel configurations based at least in part on the available supply voltage, with the parallel configuration used when the supply voltage drops below a threshold voltage and the series configuration used when the supply voltage meets or exceeds the threshold voltage.

In addition, various embodiments are disclosed herein that facilitate the switching between series and parallel configurations with minimal visual effects noticeable to a consumer (e.g., light flicker). In some embodiments, a dual bipolar junction transistor (BJT) current regulator scheme is implemented to prevent flicker associated with switching between series and parallel configurations. In such embodiments, each LED string couples to its own current regulator. When the LED strings are in a parallel configuration, both current regulators are active and regulate the current passing through a corresponding LED string. When the LED strings are in a series configuration, at least one of the current regulators is inactive and at least one of the current regulators remains active, thus regulating the current passing through the series-coupled LED strings. In this way, no dynamic current modification efforts are necessary during switching, near-constant current levels are maintained, and switching-induced flicker is mitigated. Although this disclosure describes this and other embodiments in the context of BJTs, one of ordinary skill will readily recognize that other types of switches also may be substituted for BJTs as appropriate.

Additionally, some embodiments include one or more current regulator short circuit logics (CRSCLs) to bypass, or short circuit, at least one of the current regulators when the LED strings are coupled in a series configuration. This bypass feature creates additional headroom between the supply voltage and the total voltage drop across the LED strings, because each LED and each current regulator carries a load voltage drop. By bypassing one or more of the current regulators, at least some of this voltage drop is reduced. This frees up space in the supply voltage budget and makes the lighting system less vulnerable to fluctuations in supply voltage.

The effects of fluctuations in supply voltage also may be mitigated by overvoltage protection circuits (OPCs). Such OPCs are implemented in some embodiments to prevent current from flowing through the LED strings and the attendant current regulator(s) if the supply voltage exceeds an overvoltage threshold. In this manner, the current regulator(s) and LEDs are protected during overvoltage conditions.

Furthermore, some embodiments include a threshold detection circuit (TDC). The TDC, in some embodiments, is a circuit containing multiple BJTs that simultaneously activate appropriate switches to seamlessly configure the LED strings in a series or parallel configuration. (The term "simultaneously," as used herein, means within a predetermined amount of time so that there is no discernible flicker to a human consumer.) In some such embodiments, the TDC is capable of adjusting the switching point (i.e., the supply voltage level at which the lighting system switches the LED strings from a series or parallel configuration or vice versa) based on an ambient temperature affecting the lighting system. In this way, the switching point follows the natural drift in LED drop voltages that occurs with shifts in the ambient temperature.

Finally, some embodiments include a universal control circuit (UCC). The UCC may vary in configuration, but, in at least some embodiments, it includes a BJT or a resistor that causes a corresponding pair of BJTs to switch the LED strings between series and parallel configurations simultaneously.

The foregoing embodiments are now described in greater detail with respect to FIGS. 1-4. The depictions in FIGS. 1-4 are merely illustrative and do not limit the scope of this disclosure. One of ordinary skill will recognize and be able to implement numerous modifications and variations to the embodiments expressly described herein. Furthermore, one of ordinary skill will understand that various circuit components (e.g., BJTs) specifically mentioned herein may be substituted with one or more different types of circuit components (e.g., field effect transistors (FETs)), along with any other circuit modifications necessary to implement such substitutions. Similarly, one of ordinary skill will understand that although various embodiments are described herein and depicted in the figures as being discrete circuits, the same embodiments may be implemented in integrated circuit (IC) form, as well. All such variations and permutations are contemplated and included within the scope of this disclosure.

Figure 2:
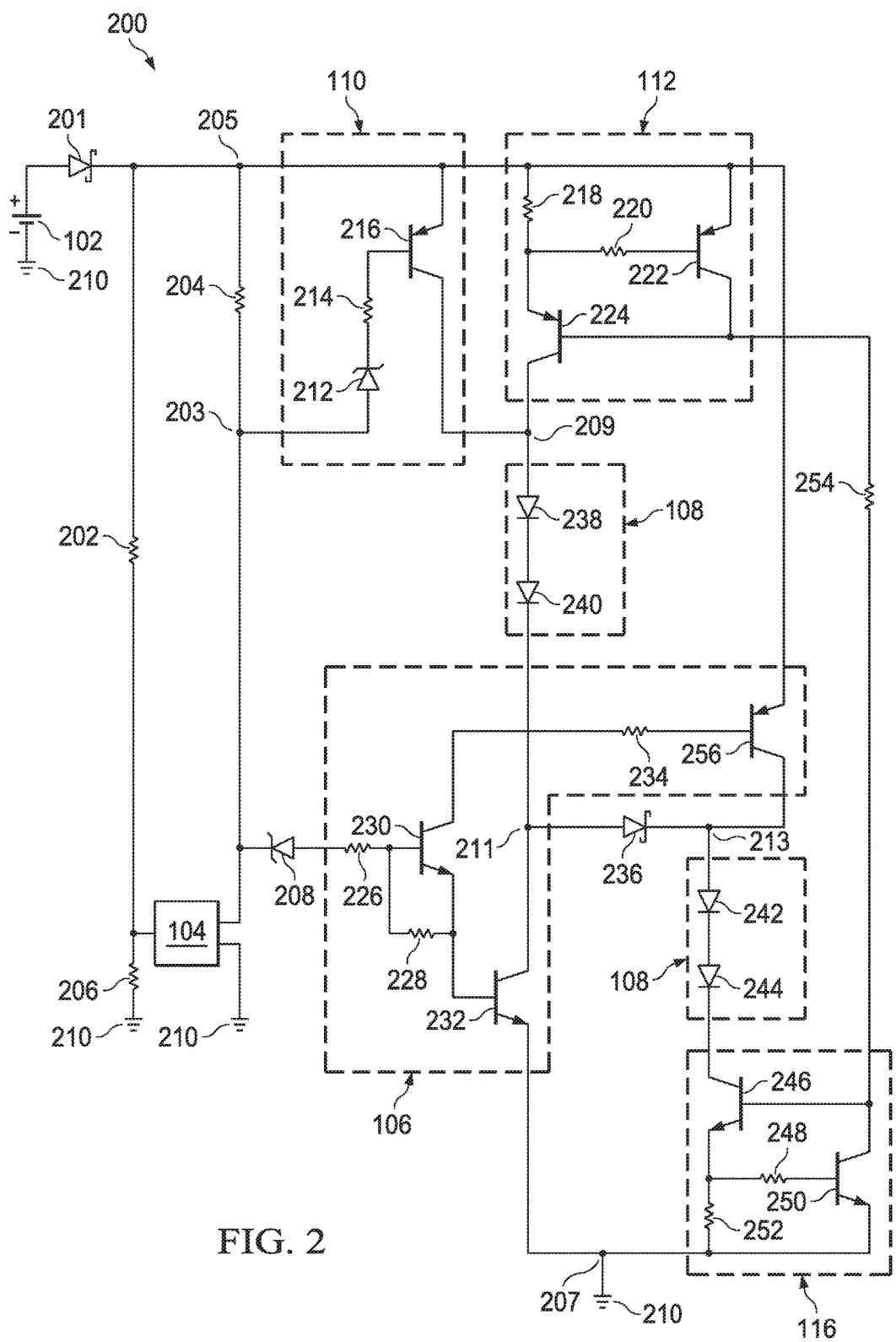
FIG. 2 is a circuit schematic of illustrative, efficient, and high-quality LED lighting system.
Figure 3:
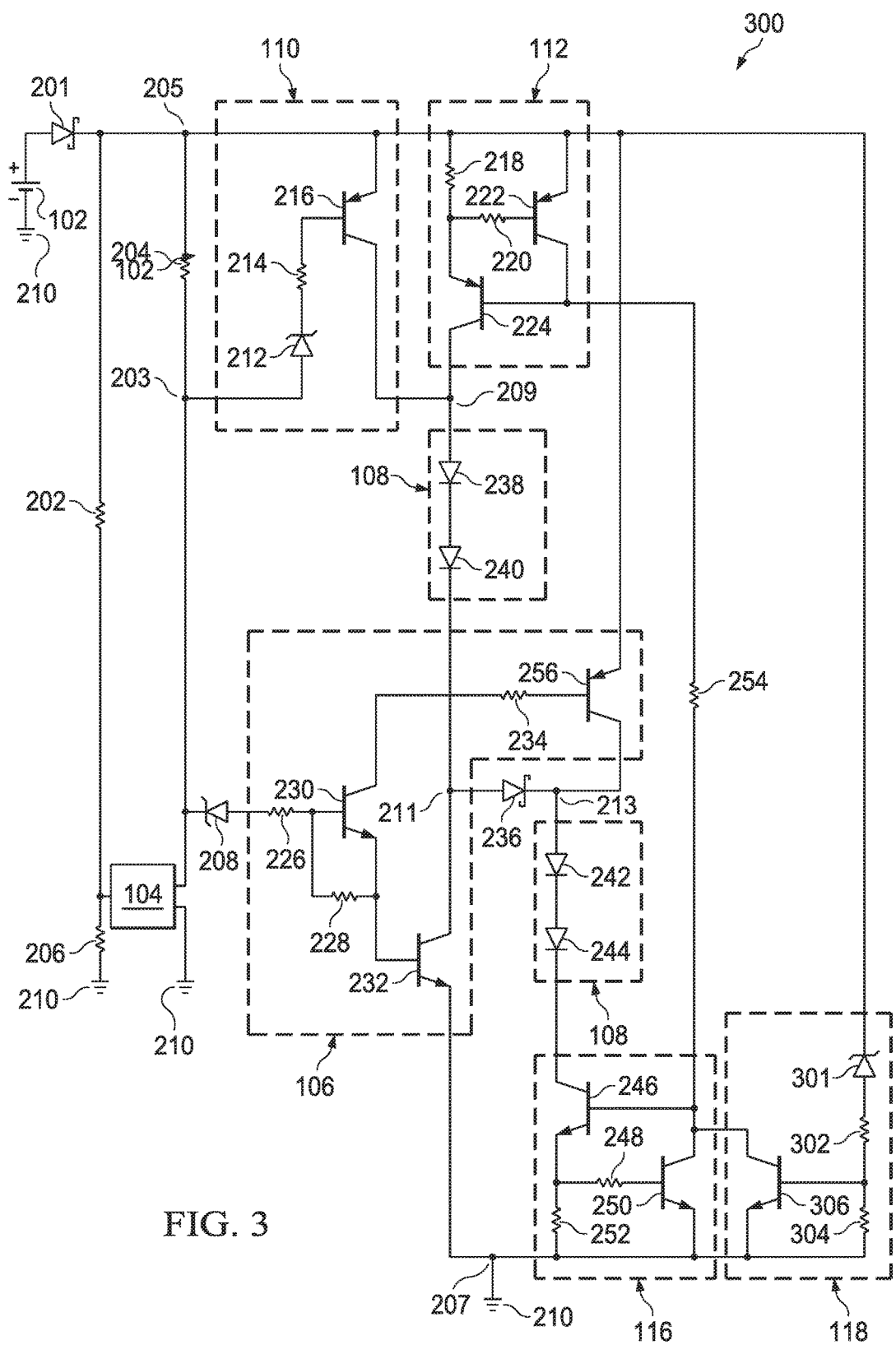
FIG. 3 is a circuit schematic of another illustrative, efficient, and high-quality LED lighting system.
Figure 4:
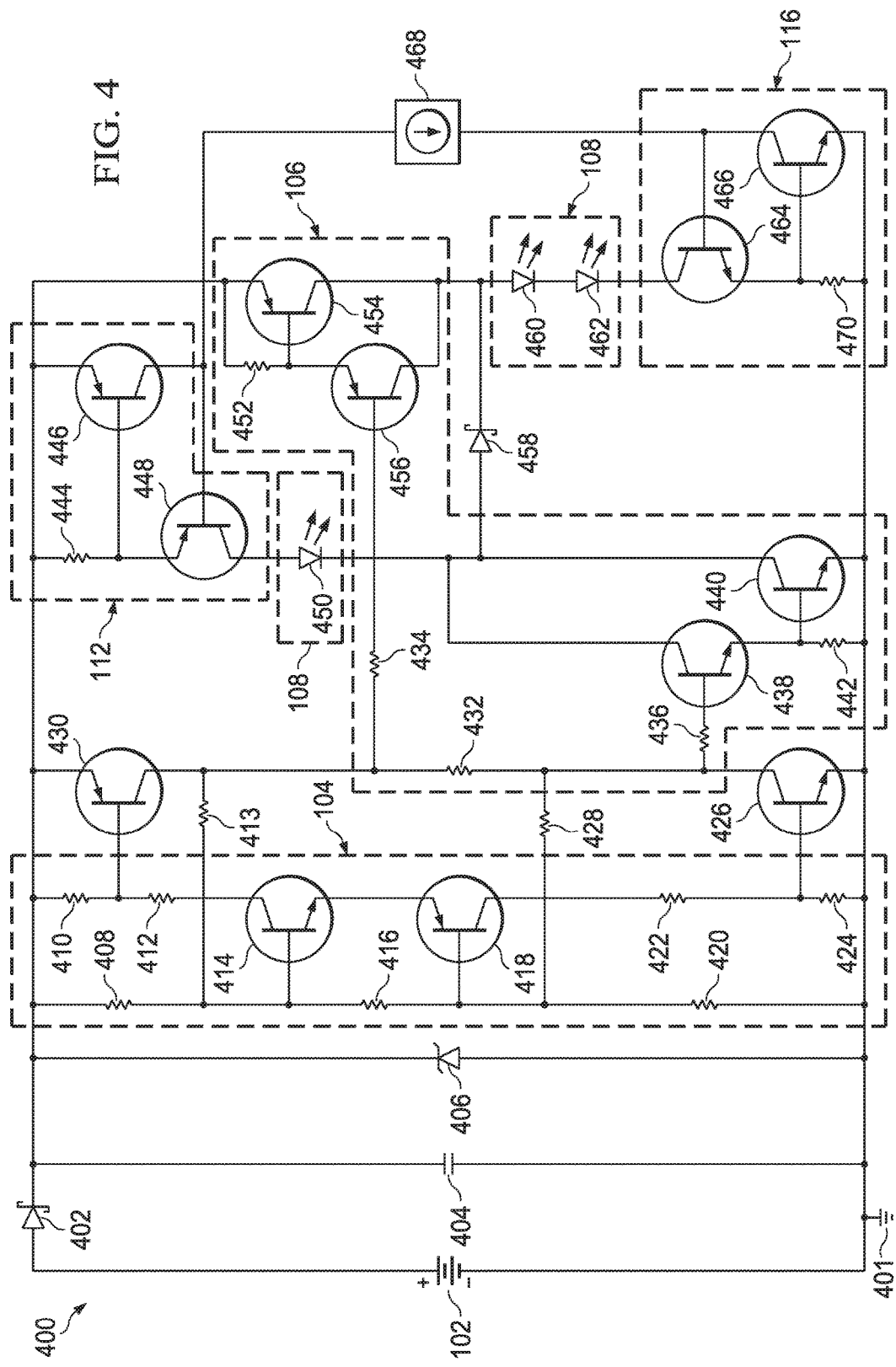
FIG. 4 is a circuit schematic of yet another illustrative, efficient, and high-quality LED lighting system.

FIG. 1 is a block diagram of an efficient and high-quality LED lighting system 100. The lighting system 100 is "high quality" in the sense that visual disturbances, such as flicker, are mitigated. The lighting system 100 is a generic representation of various embodiments described in this disclosure. In some embodiments, all of the generic components depicted in FIG. 1 may be implemented. In some embodiments, some, but not all, of the generic components depicted in FIG. 1 may be implemented (for instance, as depicted in FIGS. 2-4). In some embodiments, components omitted from FIG. 1 may be implemented. In some embodiments, one or more of the components depicted in FIG. 1 may be implemented in different ways (e.g., using different circuit components and/or different circuit configurations). In some embodiments, two or more of the components depicted in FIG. 1 may overlap with each other—for instance, by sharing one or more circuit components. All such variations are contemplated.

Still referring to FIG. 1, the illustrative lighting system 100 includes a power supply 102 (e.g., a voltage source); a threshold detection circuit (TDC) 104; a universal control circuit (UCC) 106; LED strings 108; current regulator short circuit logic (CRSCL) 110; a current regulator 112; CRSCL 114; a current regulator 116; and an overvoltage protection circuit (OPC) 118. The power supply 102 provides a voltage to the remainder of the lighting system 100. In at least some embodiments, this voltage ranges between 7 V and 30 V, inclusive, but the scope of disclosure is not limited as such. For example, in certain overvoltage conditions, the voltage supplied to the lighting system 100 may exceed 75 V or even 100 V. The threshold detection circuit (TDC) 104 monitors the voltage provided by the power supply 102. As explained below, in at least some embodiments, the TDC 104 comprises an analog circuit—for instance, in some embodiments, the TDC 104 may comprise a network of resistors and BJTs or, in other embodiments, it may comprise a TL431 designed by ON SEMICONDUCTOR®. In at least some embodiments, the TDC 104 is configured with a threshold voltage against which the TDC 104 compares the supply voltage from the power supply 102. If the supply voltage is below the threshold voltage, the TDC 104 outputs a first signal (e.g., a HIGH signal), and if the supply voltage is at or exceeds the threshold voltage, the TDC 104 outputs a different signal (e.g., a LOW signal).

The universal control circuit (UCC) 106 couples to the TDC 104 and, based on the signal provided by the TDC 104, the UCC 106 simultaneously switches multiple switches so that the LED strings 108 seamlessly switch between series and parallel configurations without any noticeable flicker or other visual disturbances. Each of the LED strings 108 comprises multiple LEDs, although in some embodiments, a single LED may be used in one or more of the LED strings. The current regulators 112 and 116 couple to the LED strings 108 and regulate the current flowing through the LED strings 108. In some embodiments, when the LED strings 108 are coupled in a parallel configuration, each of the current regulators 112 and 116 is actively regulating the current flowing through a respective LED string 108. In some embodiments, when the LED strings 108 are coupled in series, at least one of the current regulators (e.g., current regulator 112) is deactivated so that fewer (e.g., only one) current regulators regulate current flowing through the serially-coupled LED strings 108.

Deactivation of one or more current regulators occurs using one or more current regulator short circuit logics (CRSCLs), such as CRSCL 110. The CRSCL 110 provides a short circuit across the current regulator 112 when the LED strings 108 are coupled in a series configuration. This short circuiting function reduces the number of current regulators that are regulating current in the series-coupled LED strings 108, since in most cases, only one such current regulator is necessary. Furthermore, by bypassing the current regulator 112, this short circuiting function reduces the overall voltage drop across the series-coupled LED strings 108. This reduction in overall voltage drop increases the available supply voltage budget, thus decreasing the likelihood of flicker when the supply voltage drops. The CRSCL 114 functions similarly to the CRSCL 110 in that the CRSCL 114 short circuits the current regulator 116. In at least some embodiments, the CRSCLs 110 and 114 do not short their respective current regulators at the same time, regardless of whether the LED strings 108 are coupled in a series or parallel configuration.

The LED lighting system 100 also includes an overvoltage protection circuit (OPC) 118. When the supply voltage is so excessive that it meets or exceeds an overvoltage threshold (which is not the same as the threshold voltage mentioned above with respect to the TDC 104 and may be set at, e.g., 75 V or 100 V), the OPC 118 blocks the current flowing through the current regulator 116 (or, in some embodiments, it blocks the current flowing through the current regulator 112). Because the LED strings 108 couple in a series configuration when the supply voltage is high, they will be in series when an overvoltage condition occurs. Thus, when the OPC 118 blocks current flow through the current regulator 116 (or, in other embodiments, through the current regulator 112), it will, by extension, block current flow through the remainder of the serially-coupled LED strings as well. Thus, all components of the LED strings, as well as the attendant current regulators, will be protected from the overvoltage condition.

FIG. 2 is a circuit schematic of illustrative embodiments of an efficient and high-quality LED lighting system 200. The lighting system 200 includes the power supply 102; the TDC 104 (e.g., a device such as the TL431 by ON SEMI-CONDUCTOR®); the UCC 106; multiple LED strings 108; the CRSCL 110; and current regulators 112 and 116. Specifically, the lighting system 200 includes a voltage supply 102 coupled to a ground connection 210; a Schottky diode 201 (e.g., having a forward voltage of 0.4 V); a resistor 202 (e.g., 10 kilo Ohms); and a resistor 206 (e.g., 2.4 kilo Ohms) that forms a voltage divider with the resistor 202, the output of which is provided to an input of the TDC 104. The output pin of the TDC 104 is provided to node 203, which couples to resistor 204 (e.g., 10 kilo Ohms), to Zener diode 208 (e.g., having a forward voltage of 0.7 V and a reverse Zener voltage of 5.1 V), and to the CRSCL 110. The Zener diode 208 couples to the UCC 106.

The UCC 106 comprises a BJT 230 (e.g., an NPN BJT) having a base to which resistor 226 (e.g., 4.7 kilo Ohms) couples. Resistor 228 (e.g., 4.7 kilo Ohms) couples across the base and emitter of the BJT 230. The emitter of the BJT 230 couples to the base of the BJT 232 (e.g., an NPN BJT). The collector of the BJT 230 couples to a resistor 234 (e.g., 5.1 kilo Ohms), which, in turn, couples to the base of BJT 256 (e.g., a PNP BJT). The CRSCL 110 comprises a Zener diode 212 (e.g., having a forward voltage of 0.7 V and a reverse Zener voltage of 8.7 V), a resistor 214 (e.g., 2.2 kilo Ohms), and a BJT 216 (e.g., a PNP BJT). The emitter of the BJT 216 couples to node 205.

One of the LED strings 108 includes LEDs 238 and 240. The other LED string 108 includes LEDs 242 and 244. The current regulator 112 comprises a BJT 224 (e.g., a PNP BJT). The emitter of the BJT 224 couples to resistors 218 (e.g., 5.1 Ohms) and 220 (e.g., 2.2 kilo Ohms). The resistor 220 couples to the base of a BJT 222 (e.g., a PNP BJT), the emitter of which couples to node 205 and the collector of which couples to the base of BJT 224. The current regulator 116 is similar in design to the current regulator 112, except that the current regulator 116 comprises NPN BJTs. In particular, the current regulator 116 includes a BJT 246 (e.g., an NPN BJT), the collector of which couples to the LED 244 and the emitter of which couples to resistors 252 (e.g., 5.1 Ohms) and 248 (e.g. 2.2 kilo Ohms). The resistor 248, in turn, couples to the base of the BJT 250 (e.g., an NPN BJT). The emitter of the BJT 250 couples to ground 210, and the collector of the BJT 250 couples to resistor 254 (e.g., 5.1 kilo Ohms). In turn, the resistor 254 couples to the base of the BJT 224. A Schottky diode 236 (e.g., having a forward voltage of 0.4 V) couples the LED strings 108 together. In some embodiments, each of the LEDs in the LED strings 108 has a voltage drop of approximately 3 V. In some embodiments, each of the current regulators 112 and 116 requires a minimum voltage drop of approximately 1 V for full regulation current. Although illustrative parameters are given in this disclosure for various circuit components, these parameters may be varied as desired or necessary to achieve the operational functionalities describe herein.

In operation, when the supply voltage provided by power source 102 remains below a voltage threshold—for example, a voltage threshold programmed into the TDC 104—the TDC 104 may shift its output signal at node 203 from LOW to HIGH. When the output signal at node 203 is HIGH, the BJT 230 turns ON. Because the collector and emitter of the BJT 230 couple to the bases of BJTs 256 and 232, respectively, the BJTs 256 and 232 turn ON simultaneously. In addition, the Schottky diode 236 is OFF, preventing current from flowing between nodes 211 and 213. Thus, because the BJTs 256 and 232 are ON and the diode 236 is OFF, the LED strings 108 are coupled in parallel.

The current regulator 112 regulates the current flowing through the LED string 108 that contains the LEDs 238, 240.

Specifically, the BJT 222 controls the BJT 224. The resistance of the resistor 218 may be set as desired to achieve the desired current regulation through the LEDs 238, 240. Specifically, Ohm's law may be used in tandem with a BJT 222 base-emitter voltage drop of 0.66 V to set the current flowing through the LEDs 238, 240. This approach regards the resistor 220 as negligible. Similarly, the BJTs 246, 250 in the current regulator 116 and the resistor 252 regulate the current flowing through the LEDs 242, 244. Ohm's law may be used in tandem with a BJT 250 base-emitter voltage drop of 0.66 V to set the current flowing through the LEDs 242, 244. This approach regards the resistor 248 as negligible. When the output signal at node 203 is HIGH, the BJT 216 in CRSCL 110 is OFF and thus the CRSCL 110 has minimal or no effect on the remainder of the lighting system 200.

When the supply voltage provided by power source 102 meets or exceeds a voltage threshold—for example, a voltage threshold programmed into the TDC 104—the TDC 104 may shift its output signal to node 203 from HIGH to LOW. When the output signal at node 203 is LOW, the BJT 230 shuts OFF. Because the collector and emitter of the BJT 230 couple to the bases of BJTs 256 and 232, respectively, the BJTs 256 and 232 shut OFF simultaneously. Because the BJT 232 is OFF, no current flows between the LEDs 238, 240 and the node 207 via the BJT 232. Similarly, because the BJT 256 is OFF, no current flows between the LEDs 242, 244 and the node 205 via the BJT 256. The Schottky diode 236, however, is turned ON when the signal at node 203 is LOW. Accordingly, as a result of the OFF states of BJTs 256 and 232 and the ON state of Schottky diode 236, the LED strings 108 are coupled in series.

In some embodiments, when the LED strings 108 are in a series configuration, fewer than all of the current regulators may be active. For example, in FIG. 2, when the LED strings 108 are in series the current regulator 116 is active, but the current regulator 112 is not. The current regulator 112 is inactive because it is short-circuited by the CRSCL 110. When the signal at node 203 is LOW, the Zener diode 212 is ON and the BJT 216 is ON. When the BJT 216 is ON, current flows between node 205 and node 209 via the BJT 216, thus short circuiting the current regulator 112. At least some of the reasons for short-circuiting the current regulator 112 are explained above and thus are not repeated here. Thus, in at least some embodiments, when the LED strings 108 are in parallel, both of the current regulators 112, 116 are active and regulating current through their respective LED strings 108. When the LED strings 108 are in series, however, at least one of the current regulators is bypassed.

FIG. 3 is a circuit schematic of other illustrative embodiments of an efficient and high-quality LED lighting system 300. The system 300 is similar to the system 200, except that the system 300 additionally includes overvoltage protection circuit (OPC) 118. The OPC 118 comprises a diode 301 having a relatively high forward voltage (e.g., 25 V or more), a resistor 302 (e.g., 4.7 kilo Ohms), and a resistor 304 (e.g., 4.7 kilo Ohms). The resistors 302, 304 function as a voltage divider circuit, the output of which couples to the base of BJT 306 (e.g., an NPN BJT). The collector of the BJT 306 couples to the base of BJT 246 and emitter of the BJT 306 couples to node 207 (i.e., ground 210). In operation, the OPC 118 blocks current from flowing through the current regulator 116 when the supply voltage at power supply 102 meets or exceeds an overvoltage threshold. Specifically, when the overvoltage threshold is met or exceeded, the diode 301 is ON and the BJT 306 also switches ON. This precludes adequate activation current from reaching the base of the BJT 246 and the BJT 246 is turned OFF. As a result, the BJT 250 is also turned OFF. Turning OFF the BJT 246 prevents current from flowing through the current regulator 116 and the LEDs 242, 244. Further, because the overvoltage condition occurs when the supply voltage is HIGH, the LED strings 108 will be coupled in series. Thus, blocking current flow through the LEDs 242, 244 will also block current flow through the LEDs 238, 240 and the current regulator 112.

FIG. 4 is a circuit schematic of yet other illustrative embodiments of an efficient and high-quality LED lighting system 400. The system 400 includes a power supply 102 coupling to ground 401; TDC 104; UCC 106; LED strings 108; and current regulators 112, 116. The TDC 104 includes resistors 408 (e.g., 4.99 kilo Ohms), 416 (e.g., 1 kilo Ohm), 420 (e.g., the same resistance as resistor 408), 410 (e.g., 10 kilo Ohms), 412 (e.g., 1 kilo Ohm), 422 (e.g., 1 kilo Ohm), and 424 (e.g., the same resistance as resistor 410). In at least some embodiments, the resistances for resistors 410, 424 are significantly higher than those for resistors 412, 422. The TDC 104 also includes BJTs 414 (e.g., an NPN BJT) and 418 (e.g., a PNP BJT).

The UCC 106 comprises resistors 432 (e.g., 2.2 kilo Ohms), 434 (e.g., 10 kilo Ohms), 436 (e.g., 10 kilo Ohms), 442 (not populated in at least some embodiments), and 452 (not populated in at least some embodiments); and BJTs 438 (e.g., an NPN BJT), 440 (e.g., an NPN BJT), 456 (e.g., a PNP BJT), and 454 (e.g., a PNP BJT). One of the LED strings 108 comprises an LED 450, and the other LED string 108 includes LEDs 460, 462. The current regulator 112 includes BJTs 446 (e.g., a PNP BJT) and 448 (e.g., a PNP BJT) and resistor 444 (e.g., 6.65 Ohms). Similarly, the other current regulator 116 includes BJTs 464 (e.g., an NPN BJT) and 466 (e.g., an NPN BJT) and a resistor 470 (e.g., 6.65 Ohms). In addition, the system 400 comprises a Schottky diode 402 (e.g., with a forward voltage of 0.4 V, a reverse breakdown voltage of 100V, and a DC current rating of 1 A); a capacitor 404 (e.g., up to 10 micro Farads); a Zener diode 406 (e.g., with a forward voltage of 0.7 V and a reverse Zener voltage of 43 V); resistor 413 (e.g., 100 kilo Ohms); resistor 428 (e.g., 100 kilo Ohms); a BJT 430 (e.g., a PNP BJT); a BJT 426 (e.g., an NPN BJT); a Schottky diode 458 (e.g., with a forward voltage of 30 V); and a resistor or constant current regulator (CCR) 468.

The Schottky diode 402 protects against reverse battery voltages provided by the power supply 102; the capacitor 404 may be a small, surface mount ceramic capacitor that filters out inductive voltage spikes; and the Zener diode 406 is a transient voltage suppression device. Resistors 408, 416, and 420 together set the switching point (i.e., voltage threshold) at which the LED strings 108 switch between series and parallel configurations. Resistor 410 provides a leakage path around BJT 430 to prevent accidental turn-on of BJT 430. Resistor 412 limits the base current for the BJT 430, and the resistor 422 likewise limits the base current for BJT 426. The resistors 410, 412 operate as a voltage divider, the output of which couples to the base of BJT 430. Likewise, the resistors 422, 424 operate as a voltage divider, the output of which couples to the base of BJT 426. The resistors 413, 428 determine the hysteresis of the switching point. Their resistance values may be chosen to be significantly larger than those of resistors 408, 420 to minimize the latching effect. The BJT 430 switches BJTs 454 and 456 ON and OFF. Similarly, the BJT 426 switches BJTs 438, 440 ON and OFF. The BJTs 438, 440 form a Darlington pair, as do the BJTs 454, 456.

In at least some embodiments, the resistor 442 is not populated, as populating the resistor 442 can cause flicker.

The resistor 444 sets the regulation current for BJTs 446 and 448. Ohm's law may be used in combination with the BJT 446 base-emitter voltage drop of 0.66 V to set the current flowing through the LED 450. In at least some embodiments, the resistor 452 is not populated. The current regulator 116 operates in a manner similar to current regulator 112. Specifically, Ohm's law is used in tandem with a BJT 466 base-emitter voltage drop of 0.66 V to determine the current flowing through the LEDs 460, 462. The resistor/CCR 468 provides base current to the current regulators 112, 116. For very low power applications (e.g., below 50 mA LED current), a resistor may be used, but for higher power applications a two-terminal CCR is used.

In operation, the voltage across resistor 416 determines the switching point of the circuit. Higher values of resistor 416 result in lower switching points. When the supply voltage from power supply 102 is below the threshold voltage (i.e., switching point), the LED strings 108 couple in parallel. To couple the LED strings 108 in parallel, the BJTs 414, 418, 430 and 426 are OFF, all other BJTs are ON, and Schottky diode 458 is OFF. When the supply voltage from power supply 102 is at or above the threshold voltage, the LED strings 108 couple in series. To couple the LED strings 108 in series, the BJTs 438, 440, 454 and 456 are OFF, all other BJTs are ON, and diode 458 is ON. Regardless of whether the LED strings 108 are coupled in series or parallel, the current regulators 112 and 116 regulate current flowing through their respective LED strings 108. By regulating the current, visual disturbances (e.g., flicker) caused by current fluctuations are mitigated. The principle of operation of current regulators is already described above and thus is not repeated here.

The base-emitter voltage of BJTs 414, 418 has a temperature coefficient in the same direction as those of the LEDs 450, 460, and 462. This means that as the LED voltage drop drifts due to temperature fluctuations, the switching point (which is dictated by the base-emitter voltage of the BJTs 414, 418—that is, the voltage across the resistor 416) will drift with it. This is due to the inherent drop in base-emitter voltage over temperature of a BJT.

It is advantageous to switch the BJTs 440, 454 simultaneously to mitigate flicker. The resistor 432 serves as a single path through which base currents that result in the activation or deactivation of BJTs 440, 454 flow. Because these base currents flow through a common path at resistor 432, the BJTs 440, 454 are simultaneously switched ON or OFF.

As explained above, the embodiments depicted in FIGS. 2-4 are merely illustrative. Each one of these embodiments may be modified to add, remove, rearrange or modify one or more circuit components. For instance and without limitation, a current regulator short circuit logic (e.g., such as the CRSCL 110 in FIGS. 2-3) may be added to the lighting system 400, and it may be used to bypass either one of the current regulators 112, 116. Similarly, an overvoltage protection circuit (e.g., such as the OPC 118 in FIG. 3) may be added to the lighting system 400. Likewise, the lighting system 400 may be modified to use a TL431-based threshold detection circuit, similar to the TDC 104 shown in FIGS. 2-3. A different number of LED strings may be used in the lighting systems described herein, and the number of LEDs used on one or more of the strings may likewise be modified. Similarly, with respect to the lighting systems 200 and 300 depicted in FIGS. 2 and 3, the CRSCL 110 may be used to bypass the current regulator 116 instead of the current regulator 112. Alternatively, the CRSCLs may be altogether removed from the lighting systems 200 and/or 300. In some embodiments, the TL431-based TDC 104 of FIGS. 2 and 3 may be replaced with a BJT-based analog TDC, such as the TDC 104 shown in FIG. 4. Various circuit components may be substituted or modified as desired or necessary to achieve the foregoing modifications, and such variations would be within the knowledge of one of ordinary skill in the art. Any and all such variations and permutations are contemplated and included within the scope of this disclosure.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

What is claimed is:

1. A system, comprising:
   multiple light emitting diode (LED) strings configurable in series or in parallel depending on a supply voltage provided in the system; and
   multiple current regulators, a different one of the multiple current regulators coupled to each of the multiple LED strings and configured to regulate current passing through a respective LED string,
   wherein at least one of the multiple current regulators is bypassed when the multiple LED strings are configured in series.

2. The system of claim 1, wherein at least one of the multiple current regulators comprises a bipolar junction transistor (BJT).

3. The system of claim 1, wherein each of the multiple current regulators is active when the multiple LED strings are configured in parallel.

4. The system of claim 1, wherein each of the multiple LED strings comprises at least two LEDs.

5. The system of claim 1, further comprising a universal control circuit configured to simultaneously switch multiple switches to configure the multiple LED strings in series or in parallel.

6. The system of claim 1, further comprising a threshold detection circuit adapted to configure the multiple LED strings in series or in parallel based on a comparison of said supply voltage and a threshold voltage.

7. The system of claim 6, wherein said threshold voltage is a function of ambient temperature.

8. The system of claim 6, wherein the threshold detection circuit comprises multiple BJTs, and wherein base-emitter drop voltages of said multiple BJTs dictate said threshold voltage.

9. The system of claim 1, further comprising a current regulator short circuit logic configured to short circuit said at least one of the multiple current regulators.

10. The system of claim 1, further comprising an overvoltage protection circuit configured to stop current flow through said multiple LED strings when said supply voltage exceeds an overvoltage threshold and said multiple LED strings are coupled in series.

11. The system of claim 1, wherein said multiple LED strings are coupled with a Schottky diode.

12. A system, comprising:
   multiple LED strings configurable in series or in parallel depending on a supply voltage provided in the system;
   multiple current regulators, a different one of the multiple current regulators coupled to each of the multiple LED strings and configured to regulate current passing through a respective LED string; and an overvoltage protection circuit configured to block current flow through said multiple LED strings when said supply voltage exceeds an overvoltage threshold.

13. The system of claim 12, further comprising a current regulator short circuit logic configured to short circuit at least one of the multiple current regulators when the multiple LED strings are configured in series.

14. The system of claim 12, further comprising two BJTs and a diode configured to switch the multiple LED strings between series and parallel configurations.

15. The system of claim 12, wherein at least one of the current regulators comprises multiple PNP BJTs.

16. The system of claim 12, wherein at least one of the current regulators comprises multiple NPN BJTs.

17. The system of claim 12, further comprising a universal control circuit configured to simultaneously switch multiple switches to configure the multiple LED strings in series or in parallel.

18. The system of claim 12, further comprising a threshold detection circuit adapted to configure the multiple LED strings in series or in parallel based on a comparison of said supply voltage and a threshold voltage, wherein the threshold voltage varies based on an ambient temperature affecting the system.

19. A system, comprising:
a first LED string having one or more LEDs;
a second LED string having one or more LEDs, said first and second LED strings coupled via a Schottky diode and each of said first and second LED strings coupled to a different switch;
a current regulator circuit coupled to the first LED string and comprising a resistor and multiple switches; and
a current regulator short circuit logic coupled to the current regulator circuit and comprising a diode and a switch.

20. The system of claim 19, further comprising a universal control circuit configured to simultaneously switch said different switches.

* * * * *